United States Patent
Matyas et al.

(10) Patent No.: US 10,560,182 B2
(45) Date of Patent: Feb. 11, 2020

(54) AIRCRAFT COMMUNICATIONS SYSTEM FOR TRANSMITTING DATA

(71) Applicant: The Boeing Company, Chicago, IL (US)

(72) Inventors: Michael Edward Matyas, Monroe, WA (US); Stephen Y. Lee, Shoreline, WA (US); Gordon Robert Andrew Sandell, Bothell, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 15/472,688

(22) Filed: Mar. 29, 2017

(65) Prior Publication Data
US 2018/0287692 A1     Oct. 4, 2018

(51) Int. Cl.
*H04B 7/185*     (2006.01)
*H04W 80/04*     (2009.01)
*H04W 84/00*     (2009.01)

(52) U.S. Cl.
CPC ..... *H04B 7/18506* (2013.01); *H04B 7/18508* (2013.01); *H04W 80/04* (2013.01); *H04W 84/005* (2013.01)

(58) Field of Classification Search
CPC . H04B 7/18506; H04B 7/18508; H04L 67/12; H04L 69/08; H04L 63/18; H04L 69/06; H04L 12/5692; H04L 12/66; H04L 47/70; H04L 63/0853
See application file for complete search history.

(56) References Cited

U.S. PATENT DOCUMENTS

| 7,395,344 B2 | 7/2008 | Sandell et al. |
| 7,519,014 B2 | 4/2009 | Allen et al. |

(Continued)

FOREIGN PATENT DOCUMENTS

EP     2378676 A1     10/2011

OTHER PUBLICATIONS

Extended European Patent Office Search Report, dated Aug. 21, 2018, regarding application No. 18155524.4, 12 pages.

(Continued)

*Primary Examiner* — Awet Haile
(74) *Attorney, Agent, or Firm* — Yee & Associates, P.C.

(57) ABSTRACT

A method and system for an aircraft communications system. The aircraft communications system comprises an Internet protocol network router and an aircraft communications addressing and reporting system network router. The Internet protocol network router, located within an aircraft, is configured to transmit data to a group of ground stations remote to the aircraft using an Internet protocol communications link. The aircraft communications addressing and reporting system network router, located within the aircraft, is connected to the Internet protocol network router. The aircraft communications addressing and reporting system network router is configured to transmit the data from aircraft systems to the group of ground stations using at least one of an aircraft communications addressing and reporting system communications link or, via the Internet protocol network router, using at least one of an Internet protocol communications link.

20 Claims, 7 Drawing Sheets

(56) References Cited

U.S. PATENT DOCUMENTS

| | | | |
|---|---|---|---|
| 2008/0181169 A1* | 7/2008 | Lauer | H04B 7/18506 370/316 |
| 2009/0286568 A1* | 11/2009 | Cheriyath | H04L 41/0813 455/552.1 |
| 2010/0042272 A1 | 2/2010 | Gruyer et al. | |
| 2011/0047281 A1 | 2/2011 | Gruyer et al. | |
| 2011/0255506 A1* | 10/2011 | Toth | H04B 7/18506 370/331 |
| 2013/0070677 A1* | 3/2013 | Chang | G01S 13/9303 370/328 |
| 2014/0074912 A1* | 3/2014 | Nishimoto | H04L 29/06047 709/203 |

OTHER PUBLICATIONS

Mead et al., "Flight Trial Architectures Supporting Migration to Broadband IP for AOC and ATS", 25th Digital Avionics Systems Conference, Oct. 15, 2006, 9 pages.

"Building the Case for Connected Airline", Gogo, Whitepaper, The Future of Aeronautical Connectivity Report. Valour Consultancy, Oct. 2014, 19 pages.

* cited by examiner

AIRCRAFT COMMUNICATIONS SYSTEM FOR TRANSMITTING DATA

BACKGROUND INFORMATION

1. Field

The present disclosure relates generally to aircraft, and in particular, to transmitting data from an aircraft to a ground station using an aircraft communications system.

2. Background

Communications made by aircraft include voice communications and other types of data. For example, a commercial airplane exchanges data with a ground station using an aircraft communications addressing and reporting system. This type of system is also referred to as ACARS. The aircraft communications addressing and reporting system is a digital datalink system for transmitting messages between aircraft and ground stations. This transmission is typically made using radiofrequency signals and satellite signals. The ground station may be operated by an aircraft operator, a service provider, or some other third-party.

As aircraft become more complex and include more electronic systems, the amount of data transmitted by an aircraft to a ground station has increased. For example, the aircraft communications addressing and reporting system may send data at the start of each major phase of flight, as well as continuously during the operation of the aircraft. The aircraft communications addressing and reporting system may also receive data from a ground station.

This information exchanged between the commercial airplane and a ground station includes, for example, equipment health, flight plans, engine operation data, air temperature, weather information, and other suitable types of information. As the complexity and number of electronic systems increase in the commercial airplane, the amount of data transmitted also increases.

The transmission of this data over communications links used by the aircraft communications addressing and reporting system currently has high operational costs because of the amount of data sent. As the amount of data transmitted increases, the cost for transmitting the data also increases more than desired with currently used aircraft communications addressing and reporting systems.

Therefore, it would be desirable to have a method and apparatus that take into account at least some of the issues discussed above, as well as other possible issues. For example, it would be desirable to have a method and apparatus that overcome a technical problem with transmitting data from an aircraft to a ground station.

SUMMARY

An embodiment of the present disclosure provides an aircraft communications system. The aircraft communications system comprises an Internet protocol network router and an aircraft communications addressing and reporting system network router. The Internet protocol network router, located within an aircraft, is configured to transmit data to a group of ground stations remote to the aircraft using an Internet protocol communications link. The aircraft communications addressing and reporting system network router, located within the aircraft, is connected to the Internet protocol network router. The aircraft communications addressing and reporting system network router is configured to transmit the data from aircraft systems to the group of ground stations using at least one of an aircraft communications addressing and reporting system communications link or the Internet protocol communications link.

Another embodiment of the present disclosure provides a method for transmitting data with an aircraft communications system. The method comprises receiving the data from aircraft systems in an aircraft at an aircraft communications addressing and reporting system network router in an aircraft communications addressing and reporting system in the aircraft. The method selects at least one of an aircraft communications addressing and reporting system communications link or an Internet protocol communications link to send the data received from the aircraft systems to a group of ground stations. The method transmits the data using an Internet protocol network router when the aircraft communications addressing and reporting system network router selects the Internet protocol communications link for transmitting data. The Internet protocol network router is configured to transmit data to the group of ground stations remote to the aircraft using the Internet protocol communications link.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take account that transmission of the data may require using standards implemented in an aircraft communications addressing and reporting system. The illustrative embodiments recognize and take into account that safety data may be transmitted through this type of system using the standards. The illustrative embodiments also recognize and take account that other types of data may not require transmission using a particular standard. That type of data may be transmitted using a network that may provide cost, speed, and other advantages over those required to be transmitted using particular standards.

The illustrative embodiments recognize and take account that a large amount of the data transmitted from the aircraft to a ground station is often not safety related. For example, the illustrative embodiments recognize and take account that maintenance information, engine operation data, and other information may be sent that are not related to the safety of the aircraft. The illustrative embodiments recognize and take account that safety unrelated data may be transmitted using other communications links other than those typically used by an aircraft communications addressing and reporting system. The embodiments recognize and take account that these other types of communications links may have lower costs as compared to those currently used by aircraft communications addressing and reporting systems.

Thus, the illustrative embodiments provide a method and apparatus for transmitting data. In one illustrative example, an aircraft communications system comprises an Internet protocol network router and an aircraft communications addressing and reporting system network router in the aircraft. The Internet protocol network router is configured to transmit data to a group of ground stations remote to the aircraft using an Internet protocol communications link. The aircraft communications addressing and reporting system network router is connected to the Internet protocol network router, and wherein the aircraft communications addressing and reporting system network router is configured to transmit data from aircraft systems to the group of ground stations using at least one of an aircraft communications addressing and reporting system communications link or the Internet protocol communications link.

Figure 1:
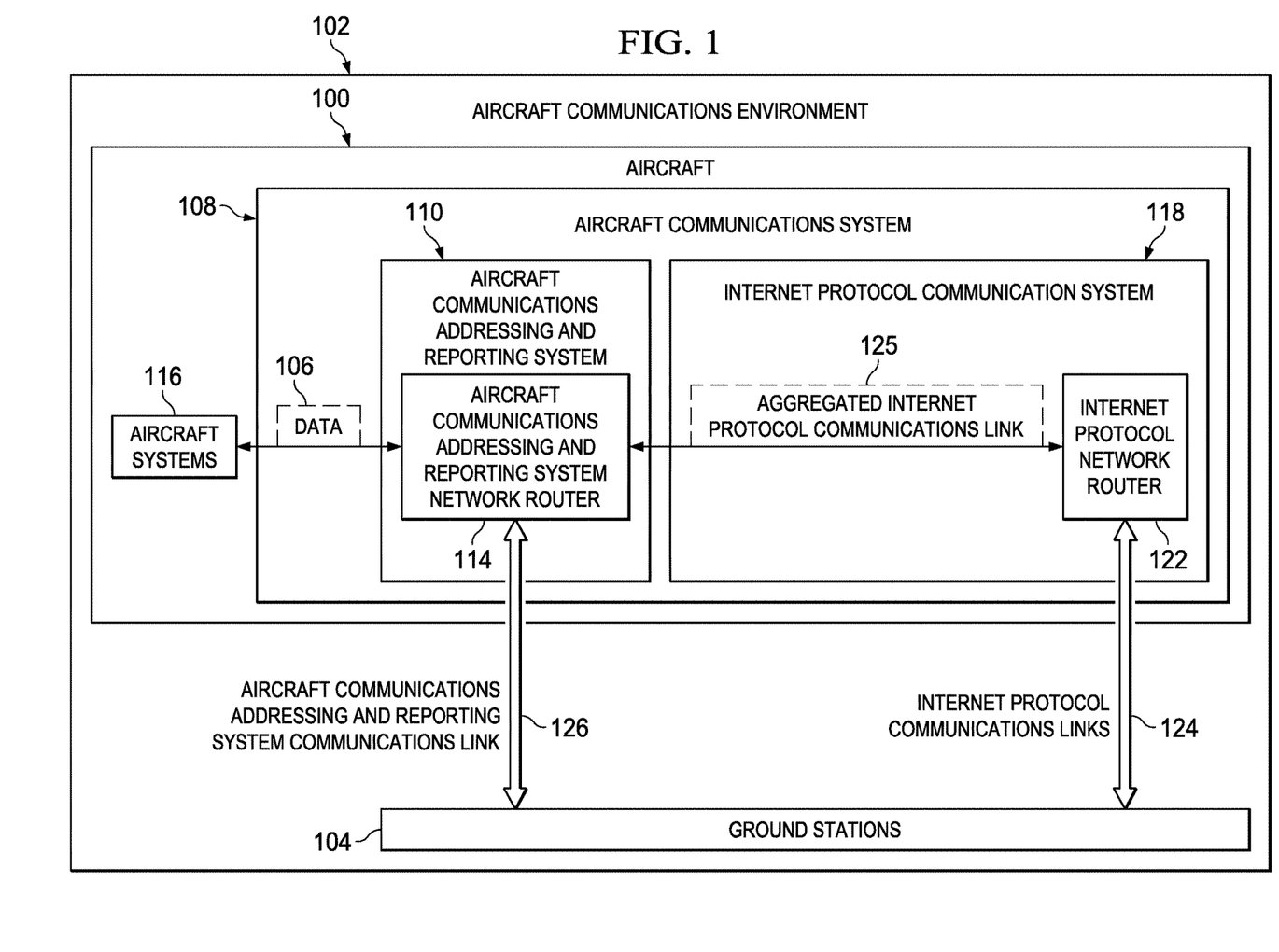
FIG. 1 is an illustration of a block diagram of an aircraft communications environment in accordance with an illustrative embodiment.

With reference now to the figures, and in particular, with reference to FIG. 1, illustration of a block diagram of an aircraft communications environment is depicted in accordance with an illustrative embodiment. In this illustrative example, aircraft 100 in aircraft communications environment 102 communicates with a group of ground stations 104.

As used herein, a "group of" when used with reference items means one or more items. For example, a group of ground stations 104 is one or more of ground stations 104.

In this illustrative example, aircraft 100 exchanges data 106 with the group of ground stations 104. Data 106 comprises at least one of flight phase event data, flight plans, weather information, equipment health and maintenance data, ping messages, test messages, flight crew messages, or other suitable types of data.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In this illustrative example, aircraft 100 includes aircraft communication system 108. As depicted, aircraft communications addressing and reporting system 110 is present in aircraft communications system 108. Aircraft communications addressing and reporting system 110 includes aircraft communications addressing and reporting system network router 114.

In this illustrative example, aircraft communications addressing and reporting system 110 is implemented using one or more ARINC standards from the Airlines Electronic Engineering Committee (AEEC). Aircraft systems 116 are connected to aircraft communications addressing and reporting system 110. Aircraft systems 116 may generate and transmit data 106.

Aircraft communications system 108 also includes Internet protocol communications system 118. Internet protocol communications system 118 includes Internet protocol network router 122. The transmission of data by aircraft communications addressing and reporting system network router 114 and Internet protocol network router 122 may be implemented using various protocols, such as file transfer protocol service (FTPS) or other suitable protocols.

As depicted, Internet protocol network router 122 in aircraft 100 is configured to transmit data 106 to a group of ground stations 104 remote to aircraft 100 using Internet protocol communications links 124. Further, aircraft communications addressing and reporting system network router 114 in aircraft 100 is connected to Internet protocol network router 122.

Aircraft communications addressing and reporting system network router 114 may be connected to Internet protocol network router 122 in a number different ways. This connection is a connection that enables communicating data 106 between these components. The connection may include wired links, optical links, wireless links or other types of connections.

In this illustrative example, aircraft communications addressing and reporting system network router 114 is configured to transmit data 106 from aircraft systems 116 to the group of ground stations 104 using at least one of aircraft communications addressing and reporting system communications link 126 or, via Internet protocol network router 122 using one or more of Internet protocol communications links 124.

In this example, Internet protocol communications links 124 is aggregated and provided as aggregated Internet protocol communications link 125 to aircraft communications addressing and reporting system network router 114 with Internet protocol network router 122 selecting one or more of Internet protocol communications links 124 to transmit data 106, if aggregated Internet protocol communications link 125 is selected for use to transmit data 106 by aircraft communications addressing and reporting system network router 114. In other words, Internet protocol network router 122 presents aggregated Internet protocol communications link 125 to aircraft communications addressing and reporting system network router 114 as a communications link that may be used to transmit data 106 although Internet protocol communications links 124 are the actual communications links present for transmitting data 106.

As depicted, aircraft communications addressing and reporting system network router 114 includes processes that allow this device to select Internet protocol communications links 124 by selecting aggregated Internet protocol communications link 125 to transmit data 106 to the group of ground stations 104. In this manner, aggregated Internet protocol communications link 125 is provided as an additional service that may be used to transmit data 106, in addition to the currently available aircraft communications addressing and reporting system communications link 126.

In this illustrative example, the group of ground stations 104 is one or more ground stations that may receive data 106. A ground station is a physical facility that has equipment for receiving data 106. As depicted, Internet protocol network router 122 and aircraft communications addressing and reporting system network router 114 may send data 106 to same or different ones of ground stations 104.

Further, aircraft communications addressing and reporting system network router 114 selects aircraft communications addressing and reporting system communications link 126 for transmitting data 106 from a group comprising a satellite communications link, a very high frequency communications link, a high frequency communications link, or some other suitable type of communications link.

Also, Internet protocol network router 122 in aircraft 100 provides aggregated Internet protocol communications link 125 as an additional aircraft communications addressing and reporting system communications link that may be selected by aircraft communications addressing and reporting system network router 114. In other words, multiple types of Internet protocol communications links may be present for use by Internet protocol network router 122. All of these Internet protocol links are presented to aircraft communications addressing and reporting system network router 114 as a single Internet protocol communications link for selection by Internet protocol network router 122 to transmit data 106 in this illustrative example.

As depicted, aircraft communications addressing and reporting system network router 114 may select Internet protocol communications links 124 to transmit data 106. When aircraft communications and reporting system network router 114 selects aggregated Internet protocol communications link 125, Internet protocol network router 122 selects one or more of Internet protocol communications links 124 from a group comprising a terrestrial wireless networking communications link, a cellular terrestrial communications link, an L band satellite communications link, a Ku band satellite communications link, a Ka band satellite communications link, or some other suitable link for Internet protocol communications.

Figure 2:
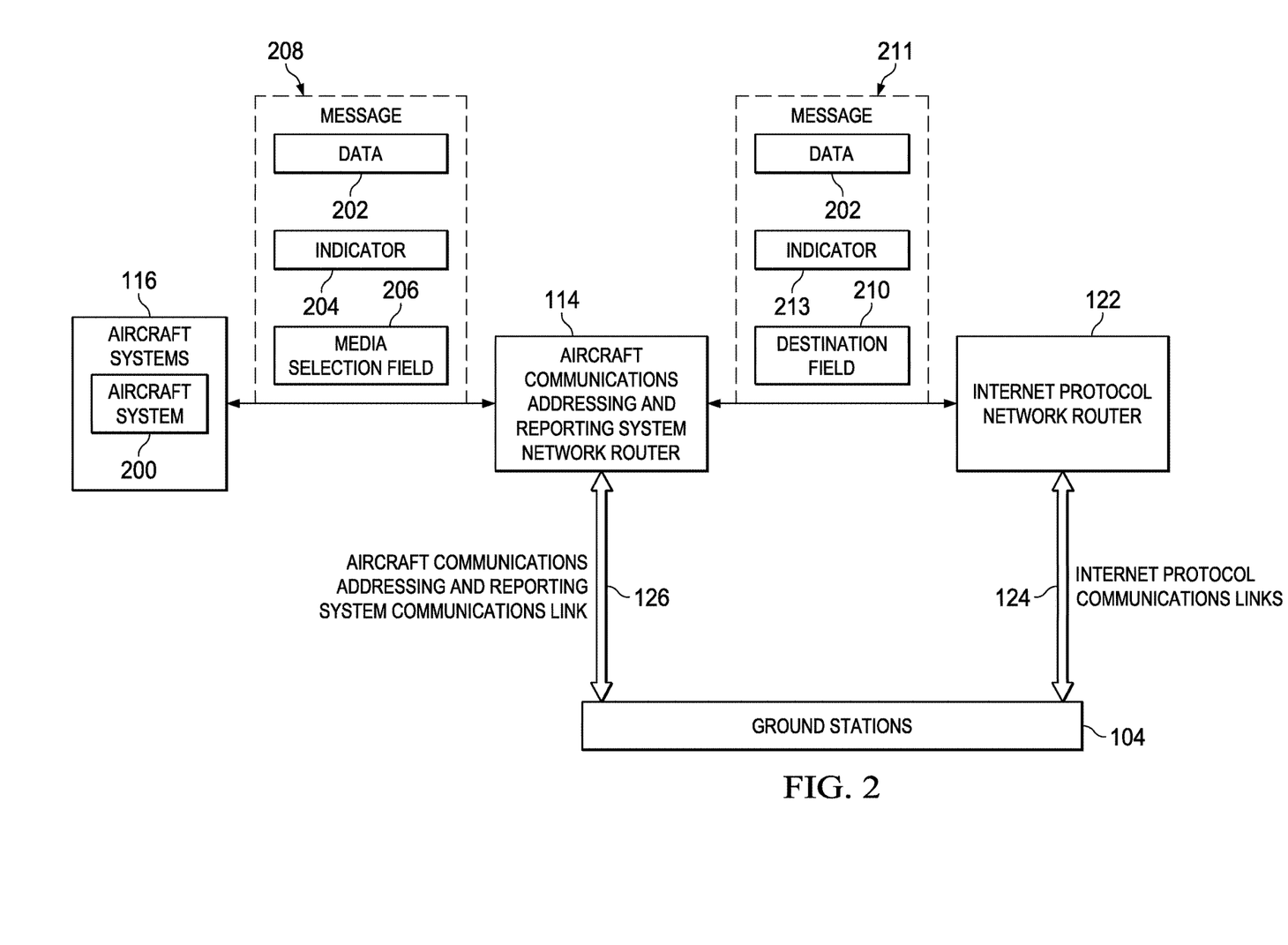
FIG. 2 is an illustration of a block diagram of an aircraft system transmitting data in accordance with an illustrative embodiment.

With reference next to FIG. 2, an illustration of a block diagram of an aircraft system transmitting data is depicted in accordance with an illustrative embodiment. In this illustrative example, aircraft system 200 is a system within aircraft systems 116 in aircraft 100 as shown in block form in FIG. 1.

In this illustrative example, aircraft system 200 generates and sends data 202, which is data within data 106 of FIG. 1. In sending data 202, aircraft system 200 sets indicator 204 in media selection field 206 that indicates that data 202 may be sent using Internet protocol communications links 124, subject to configured communication link preferences. As depicted, media selection field 206 is a field in message 208 that contains data 202.

In this example, media selection field 206 is examined by aircraft communications addressing and reporting system network router 114. The presence of indicator 204, or a particular value for indicator 204, causes aircraft communications addressing and reporting system network router 114 to route message 208 to Internet protocol network router 122. Aircraft communications addressing and reporting system network router 114 accomplishes this routing by converting message 208 into message 211 containing data 202 and corresponding fields: indicator 213 and destination field 210. The presence of indicator 213 in message 211 causes Internet protocol network router 122 to send data 202 in message 211 to the group of ground stations 104 using one or more of Internet protocol communications links 124.

In another illustrative example, aircraft communications addressing and reporting system network router 114 determines whether data 202 generated by aircraft system 200 is to be sent using one or more of Internet protocol communications links 124 based on an identification of aircraft system 200 generating data 202. Aircraft communications addressing and reporting system network router 114 may set indicator 213 in destination field 210 in message 211 containing data 202 to indicate that data 202 is to be sent using Internet protocol communications links 124. Message 211 is then routed to Internet protocol network router 122. Internet protocol network router 122 sends data 202 using one or more of Internet protocol communications links 124 upon identifying indicator 213 within destination field 210.

In the illustrative example, the selection of a communications link maybe based on the type of data being sent. For example, aircraft communications addressing and reporting system network router 114 is configured to transmit data 202 unrelated to safety through one or more of Internet protocol communications links 124.

Further, data 202 typically transmitted to the group of ground stations 104 is divided into blocks. In this illustrative example, aircraft communications addressing and reporting system network router 114 transmits data 202 without dividing data 202 into blocks when transmitting data 202 to the group of ground stations 104 using one or more of Internet protocol communications links 124.

Different components within aircraft communications system 108 in FIG. 1 may be implemented in software, hardware, firmware, or a combination thereof. These different components may include, for example, at least one of aircraft communications addressing and reporting system network router 114, Internet protocol network router 122, or other devices that process data within aircraft communications system 108. When software is used, the operations performed by aircraft communications system 108 may be implemented in program code configured to run on hardware, such as a processor unit. When firmware is used, the operations performed by aircraft communication system 108 may be implemented in program code and data, and stored in persistent memory to run on a processor unit. When hardware is employed, the hardware may include circuits that operate to perform the operations in aircraft communications system 108.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices.

Aircraft communications system 108 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Figure 3:
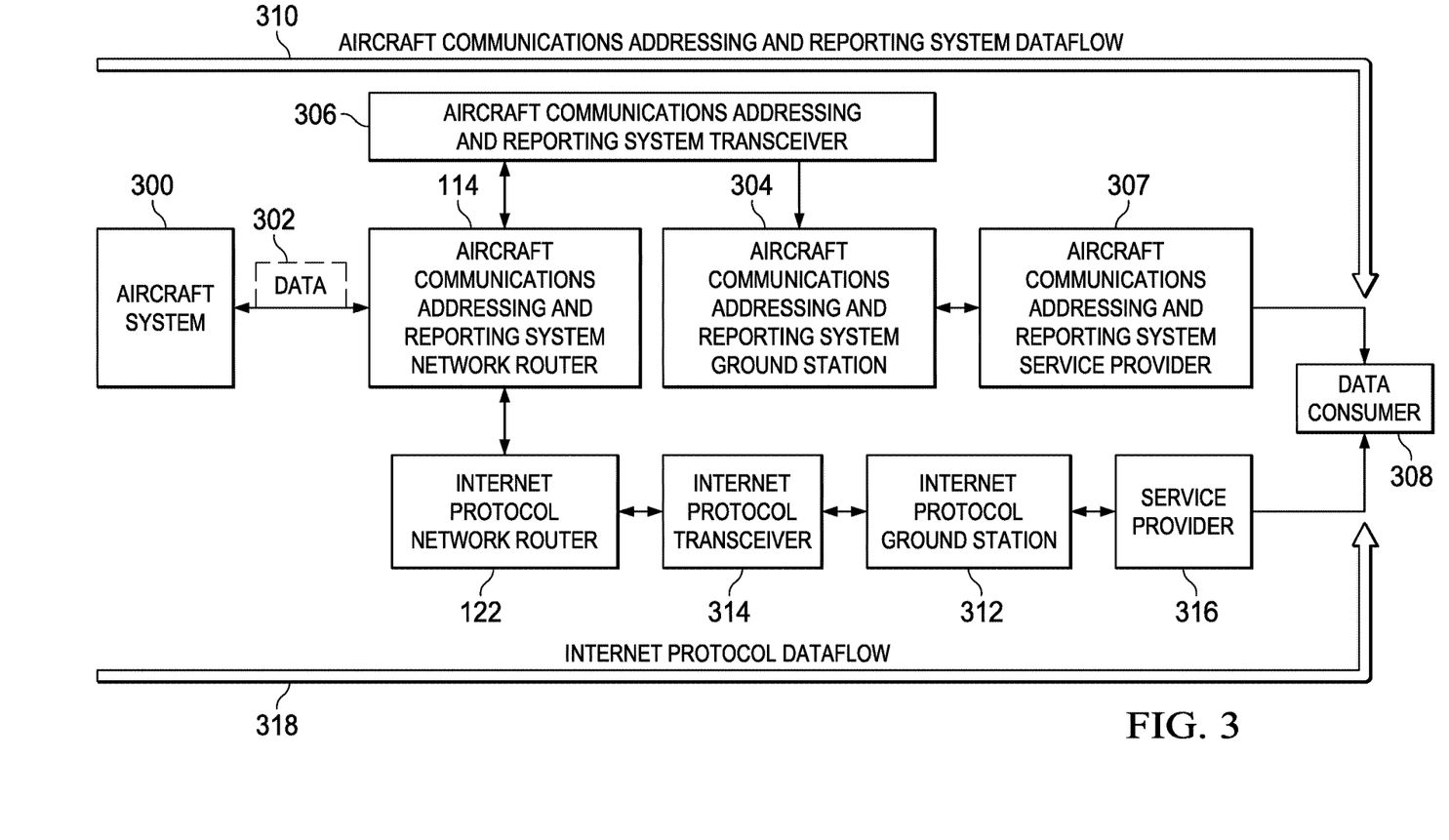
FIG. 3 is an illustration of dataflow for transmitting data to a ground station in accordance with an illustrative embodiment.

Turning next to FIG. 3, an illustration of dataflow for transmitting data to a ground station is depicted in accordance with an illustrative embodiment. In this illustrative example, dataflow for transmitting data using different types of communications links is shown.

In this example, aircraft system 300 is an aircraft system in aircraft systems 116 in FIG. 1. Aircraft system 300 generates and sends data 302 to aircraft communications addressing and reporting system network router 114. As depicted, aircraft communications addressing and reporting system network router 114 may send data 302 to aircraft communications addressing and reporting system ground station 304 using one of aircraft communications addressing and reporting system transceiver 306. In this example, aircraft communications addressing and reporting system transceiver 306 transmits data 302 using aircraft communications addressing and reporting system communications links. As depicted, aircraft communications addressing and reporting system transceiver 306 is in communication with aircraft communications addressing and reporting system service provider 307. Services providers include, for example, without limitation, AEROTHAI, ARINC, AVICOM, and SITA-OnAir.

In turn, aircraft communications addressing and reporting system service provider 307 transmits data 302 to data consumer 308. Data consumer 308 may be, for example, an airline, a third party, a maintenance service, the government entity, or some other suitable entity.

This flow of data 302 from aircraft communications addressing and reporting system network router 114 is aircraft communications addressing and reporting system dataflow 310. This dataflow utilizes communications links currently employed by aircraft communications addressing and reporting systems in aircraft.

In this illustrative example, aircraft communications addressing and reporting system network router 114 may choose to use an Internet protocol communications link to transmit some or all of data 302. In this instance, aircraft communications addressing and reporting system network router 114 sends data 302 to Internet protocol network router 122. Internet protocol network router 122 sends data 302 to Internet protocol ground station 312 using one of an Internet protocol transceiver 314. Internet protocol transceiver 314 transmits data 302 using one or more Internet protocol communications links.

Data 302 is received at Internet protocol ground station 312 and sent to service provider 316. In this example, service provider 316 may be an aircraft manufacturer, an avionics manufacturer, or some other third-party service provider. Service provider 316 sends data 302 to data consumer 308.

As depicted, the flow of data 302 from aircraft communications addressing and reporting system network router 114 to data consumer 308 via Internet protocol network router 122 is Internet protocol dataflow 318. This dataflow is an additional dataflow added for use by aircraft communications addressing and reporting system network router 114 to transmit data to ground stations and ultimately to data consumer 308. This dataflow may provide a lower cost as compared to aircraft communications addressing and reporting system dataflow 310. Further, Internet protocol dataflow 318 also may have at least one of a higher bandwidth, reliability, or transmission speeds as compared to aircraft communications addressing and reporting system dataflow 310.

In one illustrative example, one or more technical solutions are present that overcome a technical problem with transmitting data from an aircraft to a ground station, such as transmitting data using aircraft communications addressing and reporting system communications links. As a result, one or more technical solutions may provide a technical effect of enabling the transmission of data with at least one of a lower cost, faster transmission speed, higher bandwidth, increased reliability, or other desirable characteristics as compared to currently used aircraft communications addressing and reporting system communications links.

As a result, aircraft communications system 108 of FIG. 1 operates as a special purpose computer system in which at least one of aircraft communications addressing and reporting system network router 114 or Internet protocol network router 122 in aircraft communication system 108 enables greater flexibility in transmitting data 106 to a group of ground stations 104. In particular, at least one of aircraft communications addressing and reporting system network router 114 or Internet protocol network router 122 transforms aircraft communications system 108 into a special purpose computer system as compared to currently available general systems that do not have at least one of aircraft communications addressing and reporting system network router 114 or Internet protocol network router 122 that are configured to send data 106 of FIG. 1 to the group of ground stations 104 of FIG. 1 in the manner described in the different illustrative examples.

The illustration of aircraft communications environment 102 and the different components in FIGS. 1-3 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, although not shown, aircraft communications system 108 also includes at least one of a transmitter or a transceiver for sending data 106 to ground stations 104. Additionally, aircraft communications system 108 also includes a group of receivers for receiving data 106 from the group of ground stations 104. The transmitter or transceiver is connected to at least one of aircraft communications addressing and reporting system network router 114 or Internet protocol network router 122. These network routers send at least one of a command, instructions, or other information needed to cause at least one of the transmitter or transceiver to send data 106 to the group of ground stations 104. In another illustrative example, one or more aircraft communications addressing and reporting system communications links may be present in addition to aircraft communications addressing and reporting system communications link 126.

As another example, the status of data routing in aircraft communications system 108 may be displayed to the flight crew on a display system in aircraft communications system 108. The flight crew may be provided an interface to enable or disable the use of Internet protocol communications links 124 during the flight of aircraft 100. As another example, the availability of Internet protocol communications links 124 may be provided to at least one of aircraft communications addressing and reporting system network router 114, aircraft systems 116, Internet protocol network router 122, or other devices within aircraft communications system 108.

Figure 4:
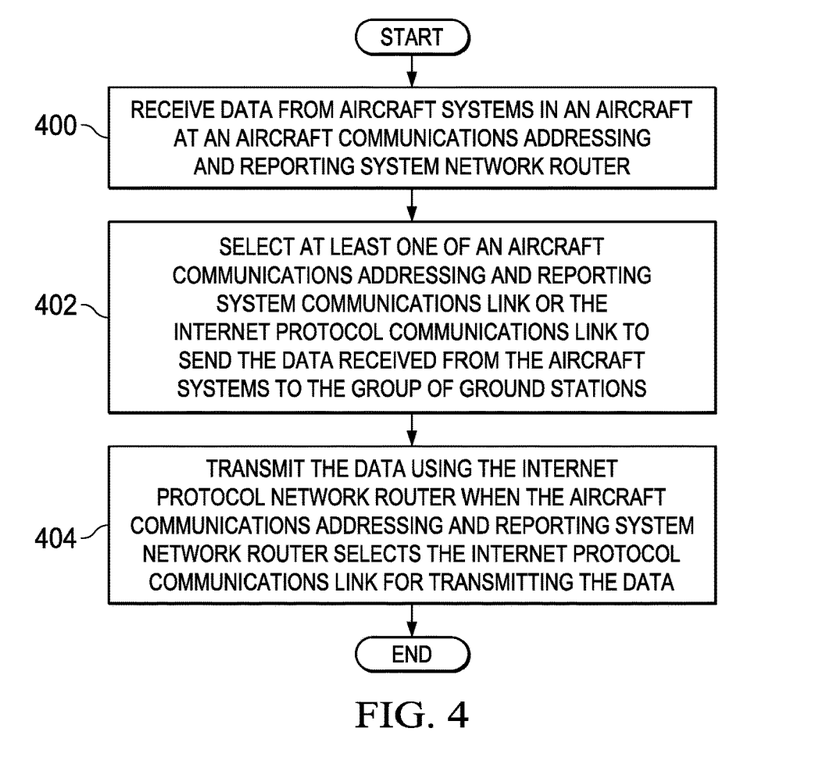
FIG. 4 is an illustration of a flowchart of a process for transmitting data with an aircraft communications system in accordance with an illustrative embodiment.

Turning next to FIG. 4, a flowchart of a process for transmitting data with an aircraft communications system is depicted in accordance with an illustrative embodiment. The process illustrated in FIG. 4 may be implemented in aircraft communications system 108. In particular, one or more operations may be implemented using at least one of aircraft communications addressing and reporting system network router 114 or Internet protocol network router 122. These operations may be implemented in program code or other types of instructions that are processed by a hardware processor unit.

The process begins by receiving data from aircraft systems in an aircraft at an aircraft communications addressing and reporting system network router (operation 400). The aircraft communications addressing and reporting system network router selects at least one of an aircraft communications addressing and reporting system communications link or the Internet protocol communications link to send the data received from the aircraft systems to the group of ground stations (operation 402).

The process transmits the data using the Internet protocol network router when the aircraft communications addressing and reporting system network router selects the Internet protocol communications link for transmitting the data (operation 404). The process terminates thereafter. The Internet protocol network router is configured to transmit data to a group of ground stations remote to the aircraft using an Internet protocol communications link.

Figure 5:
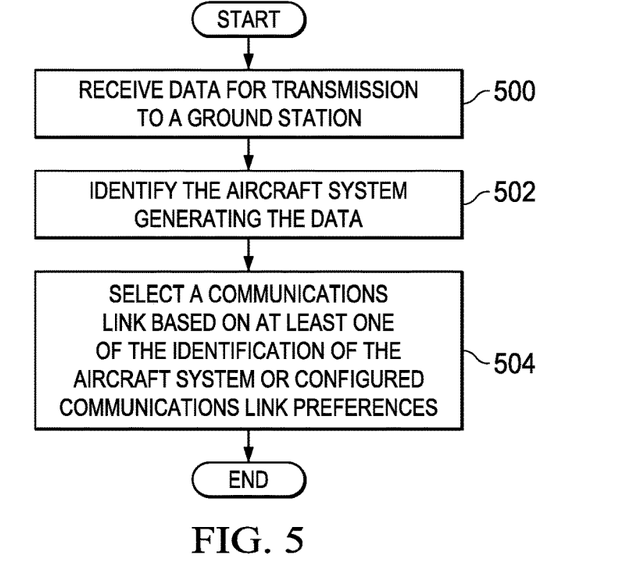
FIG. 5 is an illustration of a flowchart of a process for selecting a communications link in accordance with an illustrative embodiment.

With reference next to FIG. 5, a flowchart of a process for selecting a communications link is depicted in accordance with an illustrative embodiment. The process illustrated in FIG. 5 may be implemented in aircraft communications addressing and reporting system network router 114 in FIG. 1. This process may be implemented using software, hardware, or some combination thereof. The software may take the form of program code that is processed by a processor unit to perform the different operations.

The process begins by receiving data for transmission to a ground station (operation 500). The process identifies the aircraft system generating the data (operation 502). In operation 502 the aircraft system may be identified in a number different ways. For example, the data of the included identifier for the aircraft system or the aircraft system may be identified based on the communications link established with an aircraft communications addressing and reporting system communications network router.

The process selects a communications link based on at least one of the identification of the aircraft system or configured communications link preferences (operation 504) with the process terminating thereafter. For example, some aircraft systems may generate data that requires the data be sent by a standard, such as that implemented in aircraft communications addressing and reporting system communications link 126 in FIG. 1 and FIG. 2. Other aircraft systems may not generate data that requires a particular standard to be used. For example, aircraft systems that are safety related may require data to be sent by aircraft communications addressing and reporting system communications link 126, while other aircraft systems that are not safety related may have their data sent using one or more of Internet protocol communications links 124.

Figure 6:
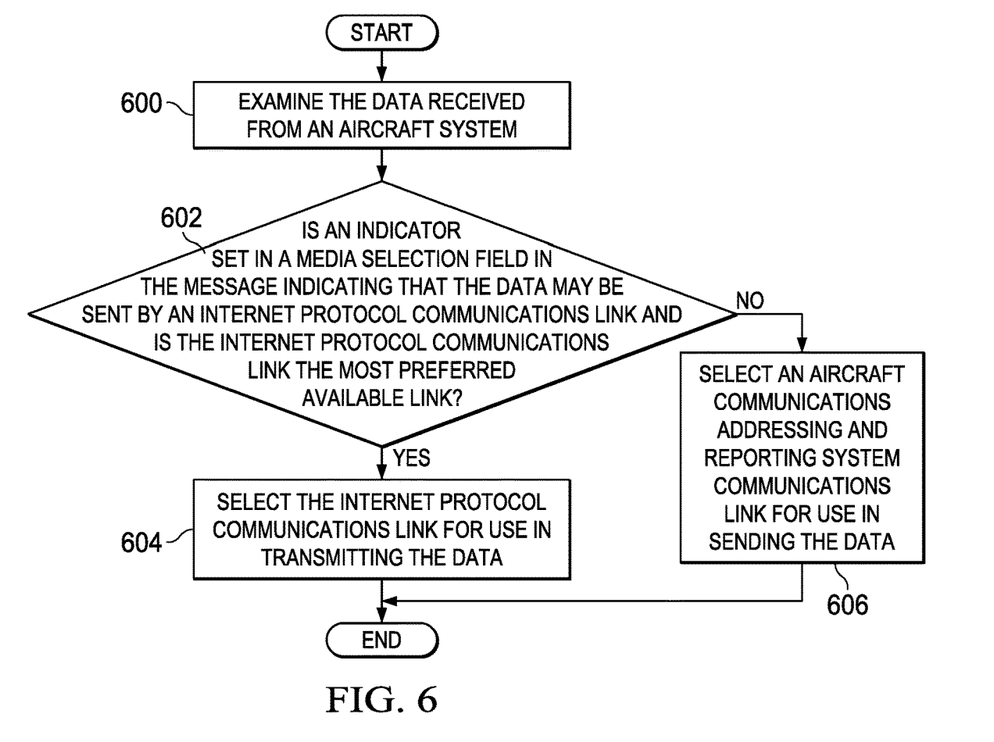
FIG. 6 is an illustration of a flowchart of a process for selecting a communications link in accordance with an illustrative embodiment.

Turning to FIG. 6, an illustration of a flowchart of a process for selecting a communications link is depicted in accordance with an illustrative embodiment. The process illustrated in FIG. 6 may be implemented in aircraft communications addressing and reporting system network router 114 in FIG. 1. This process may be implemented using software, hardware, or some combination thereof. The software may take the form of program code that is processed by a processor unit to perform the different operations.

The process begins by examining the data received from an aircraft system (operation 600). In operation 600, the data is received in a message originated by an aircraft system in the aircraft.

A determination is made as to whether an indicator is set in a media selection field in the message indicating that the data may be sent by an Internet protocol communications link and whether the Internet protocol communications link is the most preferred available link (operation 602). The data may be sent based one or more different conditions regarding the Internet protocol communications link, such as an availability, speed, latency, or other suitable factors. In some cases, the data may always be sent using the Internet protocol communications link as long as the link is available.

If an indicator is set and the Internet protocol communications is the most preferred available link, the process selects the Internet protocol communications link for use in transmitting the data (operation 604) with the process terminating thereafter. Otherwise, the process selects an aircraft communications addressing and reporting system communications link for use in sending the data (operation 606) with the process terminating thereafter.

Figure 7:
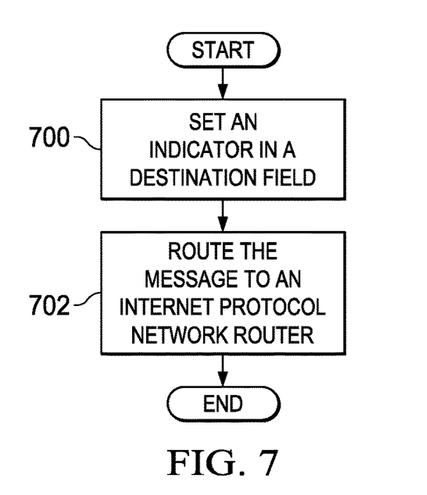
FIG. 7 is an illustration of a flowchart of a process for selecting an Internet protocol communications link in accordance with an illustrative embodiment.

Turning now to FIG. 7, a flowchart of a process for selecting an Internet protocol communications link is depicted in accordance with an illustrative embodiment. The process illustrated in FIG. 7 may be implemented in aircraft communications addressing and reporting system network router 114 in FIG. 1. This process may be implemented using software, hardware, or some combination thereof. The software may take the form of program code that is processed by a processor unit to perform the different operations.

The process begins by setting an indicator in a destination field (operation 700). In this example, the indicator is set in a destination field in a message containing the data. The indicator may be set by using a particular value in the field. In this example, the indicator indicates an Internet protocol communications link is to be used to transmit the data.

The process then routes the message to an Internet protocol network router (operation 702). The process terminates thereafter.

Figure 8:
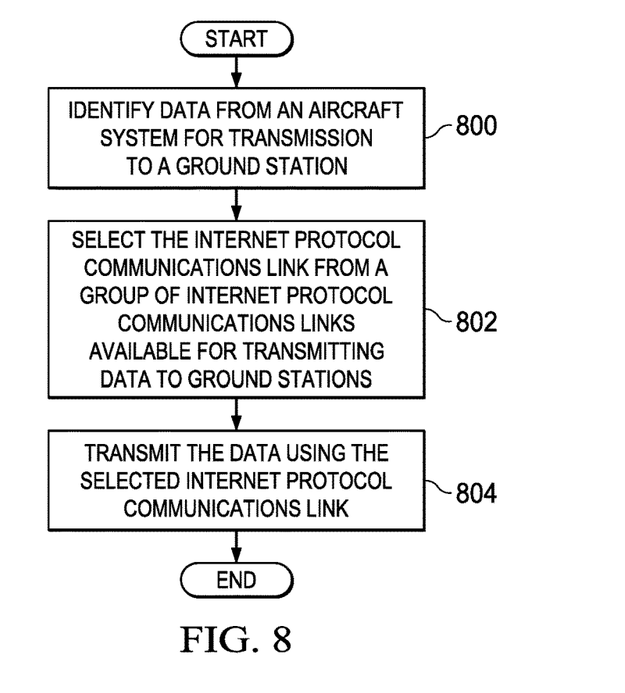
FIG. 8 is an illustration of a flowchart of a process for selecting an Internet protocol communications link in accordance with an illustrative embodiment.

Turning now to FIG. 8, a flowchart of a process for selecting an Internet protocol communications link is depicted in accordance with an illustrative embodiment. The process illustrated in FIG. 8 may be implemented in Internet protocol network router 122 in FIG. 1. This process may be implemented using software, hardware, or some combination thereof. The software may take the form of program code that is processed by a processor unit to perform the different operations.

The process begins by identifying data from an aircraft system for transmission to a ground station (operation 800). In this example, the data may be received in a message that has an indicator set to indicate that the data may be transmitted using an Internet protocol indications link. This indicator may be located in a destination field in a message containing the data. In other illustrative examples, the data may be identified as a message received from an aircraft communications addressing and reporting system network router.

The process selects the Internet protocol communications link from a group of Internet protocol communications links available for transmitting data to ground stations (operation 802). In this example, the selection of the particular Internet protocol communications link is performed by the Internet protocol network router rather than the aircraft communications addressing and reporting system network router. In this illustrative example, the aircraft communications addressing and reporting system network router is presented an aggregated Internet protocol communications link that represents the group of Internet protocol communications links that may be used to transmit the data.

The process for selecting the particular communications link is located in the Internet protocol network router. The process includes a policy that may take into account factors such as load-balancing, the type of data, the amount of data, the originating aircraft system, a ground station, or other suitable factors. The policy provides a group of rules used to select the particular Internet protocol communications link transmitting the data.

The process then transmits the data using the selected Internet protocol communications link (operation 804). The process terminates thereafter).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
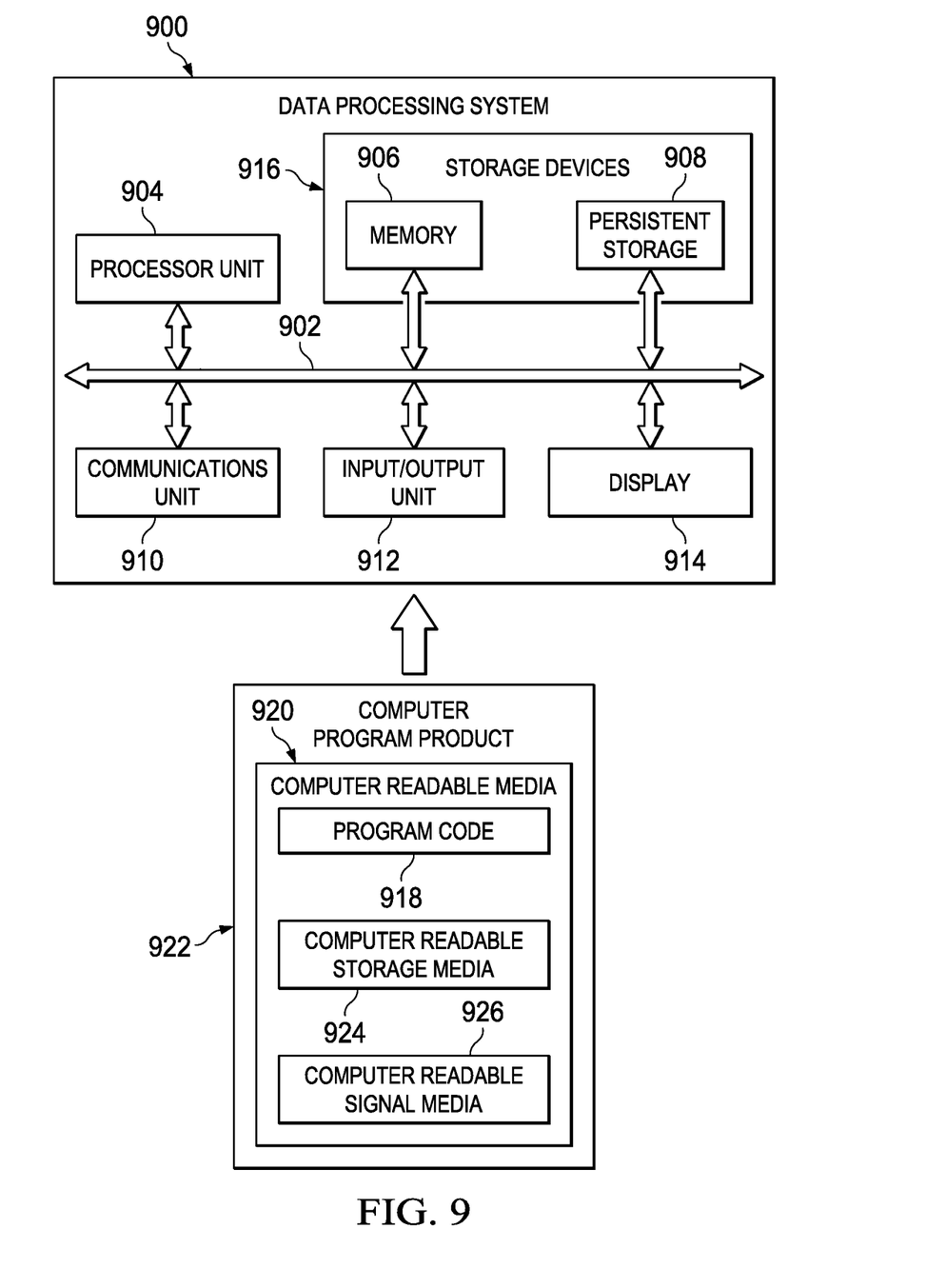
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more data processing system such as network routers or other devices in aircraft communication system 108 in FIG. 1. In this illustrative example, data processing system 900 includes communications framework 902, which provides communications between processor unit 904, memory 906, persistent storage 908, communications unit 910, input/output unit 912, and display 914. In this example, communication framework may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a solid state hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components, in addition to or in place of those illustrated, for data processing system 900. Other components shown in FIG. 9 can be varied from the illustrative examples shown. The different embodiments may be implemented using any hardware device or system capable of running program code 918.

Figure 10:
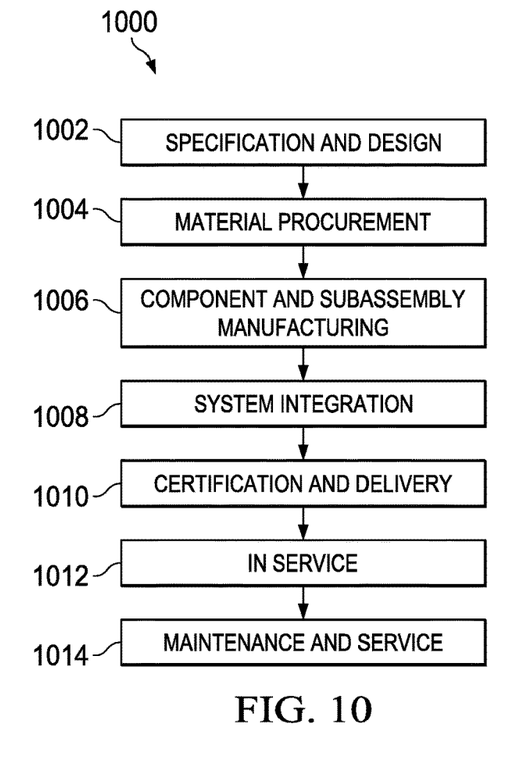
FIG. 10 is an illustration of a block diagram of an aircraft manufacturing and service method in accordance with an illustrative embodiment.
Figure 11:
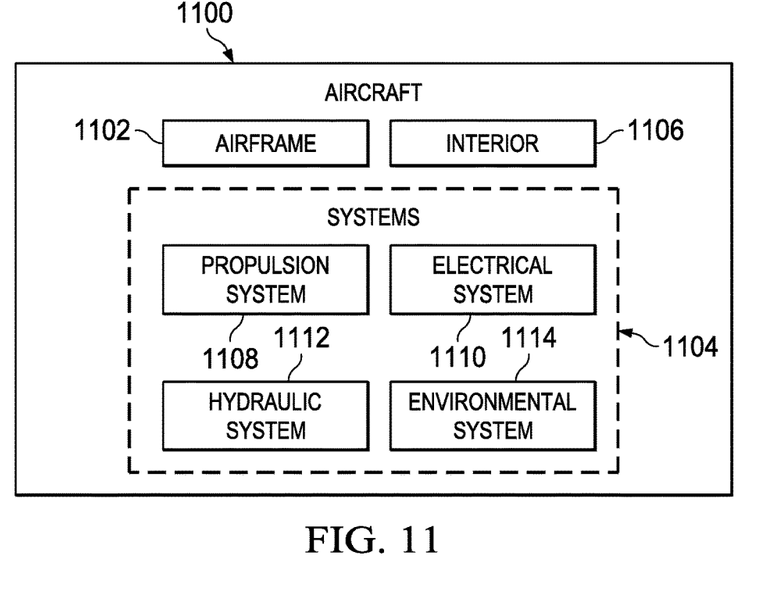
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10.

As yet another example, one or more apparatus embodiments, method embodiments, or a combination thereof may be utilized during production stages, such as component and subassembly manufacturing 1006 and system integration 1008 in FIG. 10. For example, aircraft communications system 108 may be implemented within aircraft 1100 during system integration 1008.

One or more apparatus embodiments, method embodiments, or a combination thereof may be utilized while aircraft 1100 is in service 1012, during maintenance and service 1014 in FIG. 10, or both. Aircraft communication system 108 may be operated while aircraft 1100 is in service 1012, enabling a reduction in the cost for transmitting data. Aircraft communications system 108 may be added or modified in aircraft 1100 to include features in the illustrative examples that provide transmitting data using an Internet protocol communications link in addition to or in place of other types of communications links currently used by aircraft communications addressing and reporting systems The use of a number of the different illustrative embodiments may substantially expedite the assembly of aircraft 1100, reduce the cost of aircraft 1100, or both expedite the assembly of aircraft 1100 and reduce the cost of aircraft 1100. With the use of aircraft communications system 108, data 106 may be transmitted using Internet protocol communications links 124. In this manner, the cost for transmitting data 106 to the group of ground stations 104 may be reduced.

Thus, one or more technical solutions are present that overcome a technical problem with transmitting data from an aircraft to a ground station, such as transmitting data using aircraft communications addressing and reporting system communications links. As a result, one or more technical solutions may provide a technical effect of enabling the transmission of data with at least one of a lower cost, faster transmission speed, higher bandwidth, increased reliability, or other desirable characteristics, as compared to currently used aircraft communications addressing and reporting system communications links.

In the illustrative examples, some of the data may require transmission using standards implemented in aircraft communications addressing and reporting system 110. For example, safety data may be transmitted through this network. Other types of data may not require transmission using a particular standard. This type of data may be transmitted using Internet protocol communications system 118.

Further, the illustrative examples provide an ability to preserve the current hardware and software systems used by ground stations, service providers, and other entities. The addition of an Internet protocol communications link does not require these entities to change their systems. Instead, new systems may be added or other entities may use systems designed for Internet protocol communications links.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft communications system comprising:
   an Internet protocol network router in an aircraft, wherein the Internet protocol network router is configured to transmit data to a group of ground stations remote to the aircraft using an aggregated Internet protocol communications link, the aggregated Internet protocol communications link comprising a plurality of Internet protocol communications links, wherein the Internet protocol network router is configured, when the aggregated Internet protocol communications link has been selected, to select one of the plurality of Internet protocol communications links according to a policy, the policy comprising a group of rules for selecting the Internet protocol communications link according to a plurality of factors, the plurality of factors including load-balancing, a type of data to be transmitted, an amount of data to be transmitted, and a ground station for which the data is directed;
   an interface configured receive user input, the user input provides one of enablement and disablement of the use of the Internet protocol communications link; and
   an aircraft communications addressing and reporting system network router in the aircraft, wherein the aircraft communications addressing and reporting system network router is connected to the Internet protocol network router, wherein the aircraft communications addressing and reporting system network router is configured to transmit the data from aircraft systems to the group of ground stations using at least one of an aircraft communications addressing and reporting system communications link or the Internet protocol communications link, and wherein the aircraft communications addressing and reporting system network router is configured to refrain from transmitting the data using the Internet protocol communications link when the Internet protocol communications link is disabled.

2. The aircraft communications system of claim 1, wherein the aircraft communications addressing and reporting system network router selects the aircraft communications addressing and reporting system communications link for transmitting the data from a group comprising a satellite communications link, a very high frequency communications link, and a high frequency communications link.

3. The aircraft communications system of claim 1, wherein when the aircraft communications and reporting system network router selects the aggregated Internet protocol communications link, the Internet protocol network router selects the Internet protocol communications link from a group comprising a terrestrial wireless networking communications link, a cellular terrestrial communications link, an L band satellite communications link, a Ku band satellite communications link, and a Ka band satellite communications link.

4. The aircraft communications system of claim 1, wherein an aircraft system in the aircraft is connected to the aircraft communications addressing and reporting system network router, and wherein the aircraft system sets an indicator in a media selection field that, subject to configured communication link preferences, indicates that the data is to be sent using the Internet protocol communications link.

5. The aircraft communications system of claim 1, wherein the aircraft communications addressing and reporting system network router sets an indicator in a destination field in the data in which the indicator indicates to the Internet protocol network router that the data is to be sent using the Internet protocol communications link.

6. The aircraft communications system of claim 1, wherein the aircraft communications addressing and reporting system network router determines whether the data is to be sent using the Internet protocol communications link based on at least one of an identification of an aircraft system generating the data or configured communications link preferences.

7. The aircraft communications system of claim 1, wherein the aircraft communications addressing and reporting system network router is configured to transmit the data unrelated to safety through the Internet protocol communications link.

8. The aircraft communications system of claim 1, wherein the aircraft communications addressing and reporting system network router transmits the data without dividing the data into blocks when transmitting the data to the group of ground stations using the Internet protocol communications link.

9. The aircraft communications system of claim 1, wherein the data comprises at least one of flight phase event data, flight plans, weather information, equipment health and maintenance data, ping messages, test messages, or flight crew messages.

10. The aircraft communications system of claim 1, wherein when the aggregated Internet protocol communications link has been selected, selecting one of the plurality of Internet protocol communications links according an originating aircraft system from which the data originated.

11. A method for transmitting data with an aircraft communications system, the method comprising:
    receiving the data from aircraft systems in an aircraft at an aircraft communications addressing and reporting system network router in an aircraft communications addressing and reporting system in the aircraft;
    receiving user input, wherein the user input provides one of enablement and disablement of an Internet protocol communications link;
    selecting at least one of an aircraft communications addressing and reporting system communications link or an aggregated Internet protocol communications link to send the data received from the aircraft systems to a group of ground stations, the aggregated Internet protocol communications link comprising a plurality of Internet protocol communications links, when the aggregated Internet protocol communications link has been selected, selecting one of the plurality of Internet protocol communications links according to a policy, the policy comprising a group of rules for selecting the Internet protocol communications link according to a plurality of factors, the plurality of factors including load-balancing, a type of data to be transmitted, an amount of data to be transmitted, and a ground station for which the data is directed; and transmitting the data using an Internet protocol network router when the aircraft communications addressing and reporting system network router selects the Internet protocol communications link for transmitting the data and when the Internet protocol communications link is not disabled, wherein the Internet protocol network router is configured to transmit data to the group of ground stations remote to the aircraft using the Internet protocol communications link.

12. The method of claim 11, wherein the aircraft communications addressing and reporting system network router selects the aircraft communications addressing and reporting system communications link for transmitting the data from a group comprising a satellite communications link, a very high frequency communications link, and a high frequency communications link.

13. The method of claim 11 further comprising:
selecting, by the Internet protocol network router, the Internet protocol communications link from a group comprising a terrestrial wireless networking communications link, a cellular terrestrial communications link, an L band satellite communications link, a Ku band satellite communications link, and a Ka band satellite communications link when the aircraft communications and reporting system network router selects the aggregated Internet protocol communications link.

14. The method of claim 11, wherein an aircraft system in the aircraft is connected to the aircraft communications addressing and reporting system network router further comprising:

setting, by the aircraft system, an indicator in a media selection field in that, subject to configured communication link preferences, indicates that the data is to be sent using the Internet protocol communications link.

15. The method of claim 11 further comprising:
setting, by the aircraft communications addressing and reporting system network router, an indicator in a destination field in data in which the indicator indicates to the Internet protocol network router that the data is to be sent using the Internet protocol communications link.

16. The method of claim 11 further comprising:
determining, by the aircraft communications addressing and reporting system network router, whether the data is to be sent using the Internet protocol communications link based on an identification of an aircraft system generating the data and on configured communications link preferences.

17. The method of claim 11, wherein the aircraft communications addressing and reporting system network router is configured to transmit data unrelated to safety through the Internet protocol communications link.

18. The method of claim 11, wherein the aircraft communications addressing and reporting system network router transmits the data without dividing the data into blocks when transmitting the data to the group of ground stations using the Internet protocol communications link.

19. The method of claim 11, wherein the data comprises at least one of flight phase event data, flight plans, weather information, equipment health and maintenance data, ping messages, test messages, or flight crew messages.

20. The method of claim 11, wherein when the aggregated Internet protocol communications link has been selected, selecting one of the plurality of Internet protocol communications links according an originating aircraft system from which the data originated.

* * * * *